(12) United States Patent
Narayanswamy (10) Patent No.: US 10,523,854 B2
(45) Date of Patent: Dec. 31, 2019

(54) ARRAY IMAGING SYSTEM HAVING DISCRETE CAMERA MODULES AND METHOD FOR MANUFACTURING THE SAME

(71) Applicant: Intel Corporation, Santa Clara, CA (US)

(72) Inventor: Ramkumar Narayanswamy, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/750,772

(22) Filed: Jun. 25, 2015

(65) Prior Publication Data

US 2016/0381260 A1 Dec. 29, 2016

(51) Int. Cl.
*H04N 5/225* (2006.01)
*H04N 5/073* (2006.01)
*H04N 5/04* (2006.01)
*G02B 27/00* (2006.01)

(52) U.S. Cl.
CPC ......... *H04N 5/2258* (2013.01); *H04N 5/2257* (2013.01); *H04N 5/073* (2013.01)

(58) Field of Classification Search
CPC ...... H04N 5/2253; H04N 5/04; H04N 5/2254; H04N 5/2258; H04N 5/2257; H04N 5/073; G02B 27/00
USPC ...... 359/625, 626, 618–621; 348/218.1, 143, 348/159, 373–376, 139, 154, 155, 169, 348/529, 542; 396/529, 542; 257/428, 257/433
See application file for complete search history.

(56) References Cited

U.S. PATENT DOCUMENTS

| | | | | |
|---|---|---|---|---|
| 7,796,187 | B2* | 9/2010 | Shangguam | H04N 5/225 348/374 |
| 9,313,389 | B2* | 4/2016 | Chuang | H04N 5/2257 |
| 2005/0046740 | A1 | 3/2005 | Davis | |
| 2006/0132644 | A1* | 6/2006 | Shangguan | H01L 27/14618 348/374 |
| 2010/0171192 | A1* | 7/2010 | Hiltunen | H04N 5/2253 257/459 |
| 2011/0069189 | A1* | 3/2011 | Venkataraman | H04N 5/225 348/218.1 |

(Continued)

FOREIGN PATENT DOCUMENTS

| | | |
|---|---|---|
| KR | 100867524 | 11/2008 |
| KR | 1020120021083 | 3/2012 |

OTHER PUBLICATIONS

Notification of Transmittal of the International Search Report and the Written Opinion of the International Searching Authority issued for International Patent Application No. PCT/US2016/030918, dated Aug. 24, 2016.

(Continued)

*Primary Examiner* — Marly S Camargo
(74) *Attorney, Agent, or Firm* — International IP Law Group, P.L.L.C.

(57) ABSTRACT

An array imaging apparatus having discrete camera modules is disclosed. In one embodiment, the apparatus comprises a substrate; and heterogeneous camera modules attached to the substrate and in a geometric relationship with each other, the heterogeneous camera modules having a substantially similar photometric response.

20 Claims, 5 Drawing Sheets

(56) References Cited

U.S. PATENT DOCUMENTS

| | | | |
|---|---|---|---|
| 2011/0122308 A1* | 5/2011 | Duparre | H04N 5/225 348/340 |
| 2011/0292182 A1 | 12/2011 | Ogasahara | |
| 2012/0026325 A1 | 2/2012 | Bunker et al. | |
| 2013/0120538 A1* | 5/2013 | Shin | H04N 13/02 348/47 |
| 2014/0192224 A1* | 7/2014 | Laroia | H04N 5/2258 348/224.1 |
| 2015/0124151 A1* | 5/2015 | Rodda | H04N 5/2254 348/336 |
| 2015/0146030 A1* | 5/2015 | Venkataraman | H04N 5/23232 348/218.1 |
| 2016/0182821 A1* | 6/2016 | Shabtay | H04N 5/23232 348/208.1 |

OTHER PUBLICATIONS

International Preliminary Report on Patentability and the Written Opinion of the International Searching Authority for International Application No. PCT/US2016/030918, dated Jan. 4, 2018, 12 pages.

* cited by examiner

ARRAY IMAGING SYSTEM HAVING DISCRETE CAMERA MODULES AND METHOD FOR MANUFACTURING THE SAME

FIELD OF THE INVENTION

Embodiments of the present invention relate to the field of cameras; more particularly, embodiments of the present invention relate to multi-camera arrays having discrete camera modules.

BACKGROUND OF THE INVENTION

Figure 1:
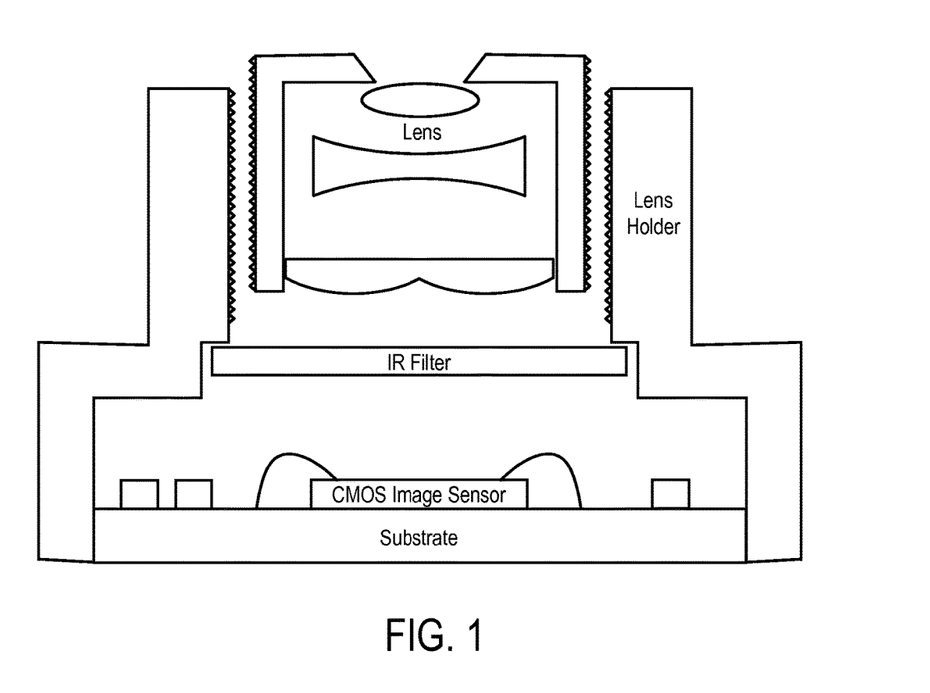
FIG. 1 illustrates a camera module.

The camera in a mobile phone or tablet platform is typically referred to as a camera module. Traditionally, a camera module consists of a single sensor and a single lens producing a single image of the scene with each exposure. FIG. 1 illustrates a camera module that consists of an image sensor (typically CMOS) mounted to a substrate, a lens and a lens holder. The CMOS sensor can be in a pre-packaged form or a bare-die which is then bonded to the substrate in a highly clean environment. Once the sensor is attached to the substrate, the lens holder is precisely placed such that the optical axis of the lens matches with center of active sensor array. Once the lens holder is in place and glued, the lens is attached to the lens holder and threaded in. The focal position of the lens is adjusted in order to maximize the module modulation transfer function (MTF) across various field positions and a couple of object positions. The factories manufacturing the cameras module have finely tuned this process and are able to consistently produce high quality modules with higher than 90% yield and excellent throughput. The net result is that the camera module has high mechanical tolerances and consistent optical performance.

Figure 2:
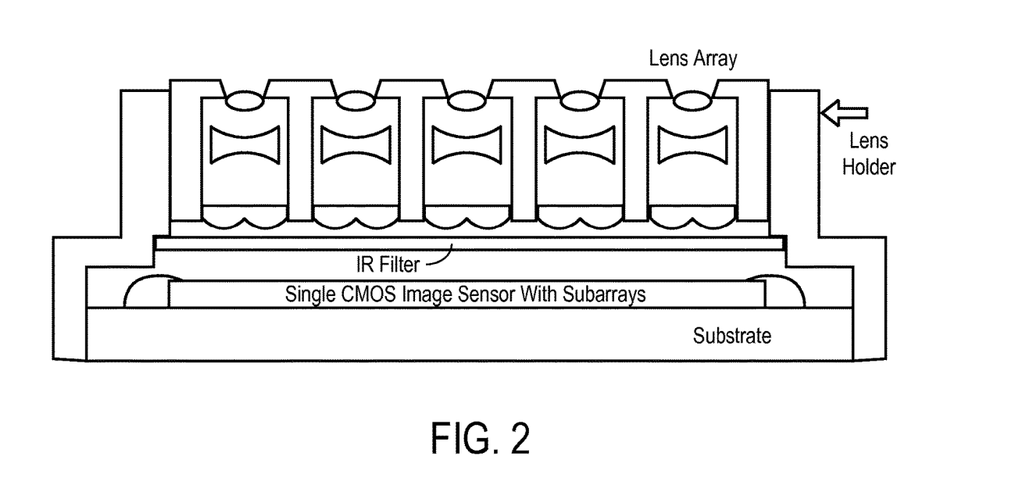
FIG. 2 shows a multi-camera array using a monolithic sensor and a single lens.

The camera-array or multi-camera system is a new area of development in imaging. Such systems can simultaneously capture multiple views of the scene using multiple lenses. Having multiple views of the same scene enables the system to extract depth of the objects in the scene using the parallax between the various views. In the past, a camera-array module was built using a single custom-designed CMOS sensor on a monolithic piece of silicon. These are custom-designed sensors include sub-arrays, with each sub-array having their own control and read-out circuits. FIG. 2 shows a multi-camera array using a monolithic sensor and a single lens with lens-lets to match each sub-array unit in the sensor.

There are a number of problems associated with manufacturing an array camera. First, in order to build a camera-array module, the array sensor is assembled with a lens-array which is a single unit with multiple lenses. Each sub-array has its own lens-let such that the optical center of the sub-array and lens-let are matched. In order for the all the sub-modules to have consistently good focus, the factories have to develop new ways to focus the lens and test the modulation transfer function (MTF) of each sub-camera module. One of the methods for this purpose used is referred to as "active alignment," in which the lens position is actively controlled in the x, y and z directions and when the correct position is found the lens is glued in-situ and snap-cured. This process requires high precision stations and the takes significantly more time compared to a traditional module assembly step, thus reducing overall assembly line through-put. The array module yield is also low since the sub-par performance of a sub-array in the entire array will force the entire module to be rejected. There is limited scope to re-work a selected sub-array given how the module is put together. As a result, the array module assembly requires new capital equipment and changes to established module assemblies work flow, which adds to the module cost.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A multi-camera array and method for building the same are described. In one embodiment, the array camera system are built using discrete off the shelf camera modules. In one embodiment, a multi-camera system is built using a collection of individual mobile phone camera modules to form a multi-camera platform. In one embodiment, this is enabled through the use of component pick-and-place machines and reflowable materials using in camera-optics.

In one embodiment, the multi-camera array comprises a substrate; and multiple, heterogeneous camera modules attached to the substrate and in a geometric relationship with each other. The heterogeneous camera modules have a substantially similar photometric response. This may be in terms of the passive disparity and depth, white balance, sharpness, gamma, and noise level.

In one embodiment, each camera module comprises a sensor, lens, a lens holder, and an infra-red (IR) filter. In one embodiment, the camera modules are reflowable camera modules. In one embodiment, the camera modules are soldered to the substrate using surface mount technology (SMT). In one embodiment, the substrate comprises a stiffened printed circuit board (PCB) with a low coefficient of expansion material. In one embodiment, the substrate comprises a ceramic substrate. In one embodiment, the camera modules are synchronized with each other. In various embodiments, the camera modules are synchronized with each other using a synchronization pin of each camera module, a frame-synch pin of each module, or a general purpose input/output (GPIO) pin, or software commands sent to the camera modules over a control bus (e.g., an I2C bus).

Figure 3:
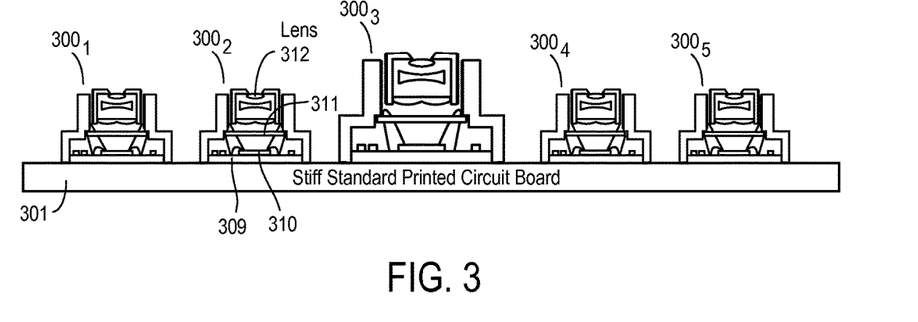
FIG. 3 illustrates one embodiment of a multi-camera array with independent camera modules attached to a substrate.

FIG. 3 illustrates a multi-camera system. Referring to FIG. 3, independent, heterogeneous camera modules $300_{1-5}$ are attached to a printed circuit board (PCB) (i.e., a substrate). Specifically, camera module $300_1$, $300_2$, $300_4$ and $300_5$ are the same and different from camera module $300_3$. In one embodiment, camera modules $300_{1-5}$ are discrete off-the-shelf camera modules, thereby obviating the need for a custom imaging array sensors and custom array optics. In one embodiment, each of camera modules $300_{1-5}$ includes a sensor, a filter (e.g., an infra-red (IR) filter), a lens, and a lens holder. For example, camera modules $300_2$ includes sensor 310 (e.g., a Complementary Metal Oxide Silicon (CMOS) sensor), IR filter 311, lens 312 with a lens holder holding IR filter 311 and lens 312 in place.

In one embodiment, the camera sensors of the camera modules in the array are different. In one embodiment, all the camera sensors could be RGB sensors, while one camera sensor is a Bayer pattern camera sensor. In another embodiment, one or more of the camera sensors are monochromatic sensors (e.g., R, G, or B). In other embodiments, all the sensors are all the same type (e.g., RGB) but at least one is bigger than the other. In another embodiment, one of the camera sensors has a short focal length and is used as a wide angle camera, while another camera sensor has a large focal length and is used as a telephoto camera.

In one embodiment, the multi-camera system of FIG. 3 is characterized by the geometric relationship between each camera module with respect to the rest of the cameras in the multi-camera system. In one embodiment, the focal length of the homogenous camera modules is close to identical. Once these parameters and geometric relationships are characterized and calibrated, the system should remain calibrated.

In one embodiment, to create the multi-camera assembly, standard assembly processes are used.

In one embodiment, the multi-camera system, such as shown in FIG. 3, has three characteristics. First, the geometric relationship between the multiple apertures is reliable and repeatable, with a tolerance of 500 microns and that this geometric relationship can be held rigidly over the long term. Second, the photometric response of the multiple apertures are consistently close, or substantially the same. Third, the multiple camera's image can be synchronized with respect to each other.

In one embodiment, to ensure the geometric relationship between the sub-arrays remains the same, the substrate to which the camera modules are attached is rigid. This will maintain the integrity of the geometry of the array. In one embodiment, the substrate is a PCB with stiffeners with a low coefficient of expansion material, which are available today. In another embodiment, the substrate is a ceramic substrate and a low coefficient of expansion.

In one embodiment, the camera modules are attached to the substrate using pick and place machines and surface-mounted-technology. In one embodiment, the off-the-shelf camera modules are soldered onto a PCB using SMT methods. Once the camera modules are soldered on the printed circuit board, the stiffened PCBs or ceramic substrates help maintain the geometric relationship between the various camera modules in the multi-camera arrangement.

In one embodiment, the camera modules used in the multi-camera system have a consistent photometric response.

In one embodiment, the camera modules in the multi-camera system are synchronized, the synchronization occurs using an external synchronization pin of the camera sensor, which establishes the temporal relationship between the various modules. In one embodiment, synchronization occurs by the use of a dedicated Frame-Sych pin. In another embodiment, synchronization occurs by the use of a general-purpose I/O (GPIO) pin on the camera sensor configured as a synchronization pin. Such a GPIO pin once configured as a synchronization pin is equivalent to having a dedicated Frame-Sync pin. In yet another embodiment, software commands are used and sent to the camera modules over a control bus (e.g., an I2C bus) in order to synchronize their operation.

The multi-camera systems described herein can be assembled in a number of ways. In one embodiment, the camera modules are placed accurately on a stiff PCB and held in place using sockets or other special retainers. An example of the retainers are shown in as shown in FIG. 3. The retainers can take many forms. If the fundamental unit is camera module with solder-bumps at the bottom, then the camera modules are directly soldered onto the stiffened PCB and that is what holds them to the stiffened PCB. In another instance, the bare sensor die is attached to the PCB and wire-bonded to the substrate. Once this has been done, the lens holder and lens are attached to the CMOS sensor and flash-glued in place. In a third instance, if the camera module has a flexible-cable coming out the module, then the module is secured to a specific place on the PCB using a custom mechanical holder or an enclosure, thereby holding the module in a specific orientation. This enclosure can be attached to the PCB using solder-bonding.

In another embodiment, the sensors are first attached to the PCB in a clean room using SMT techniques and once the sensors are in place, an individual lens holder is placed over them and the lens are attached and adjusted for maximum performance. In one embodiment, adjustments include making the lens focus is to focus to the same focal distance. The lens focus adjustment also delivers similar MTF across all the field-point of the image.

In one embodiment, power and/or gating is used to control power consumption of the individual camera modules. A controller, based on whether one or more camera modules is idle and/or not needed to be used in the near future, is able to control clocking and/or power to the individual modules.

Figure 4:
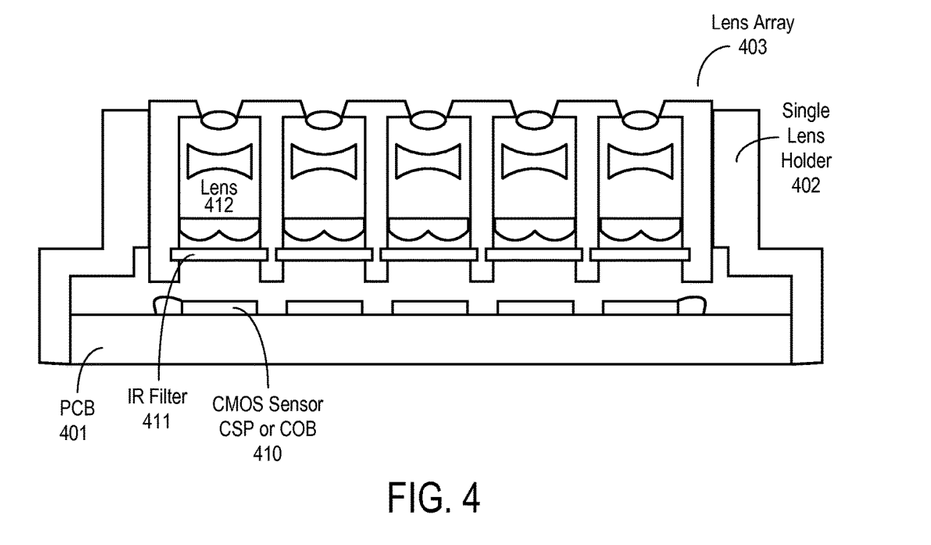
FIG. 4 illustrates one embodiment of a multi-camera array with individual camera sensors attached to a substrate along with a single lens holder.

FIG. 4 illustrates such a multi-camera system. Referring to FIG. 4, sensors 410 (e.g., CMOS sensors) are attached to PCB 401. After sensors 410 are attached, a single lens holder 402 is attached to PCT 401. Lens holder 402 holds lens array 403 in place such that the individual lens (e.g., lens 402) and IR filters (e.g., IR filter 411) are positioned and held in place over their respective sensor (e.g., sensor 410).

In one embodiment, the camera sensors are packaged sensor parts, like in chip-scale-packages. These chip-scale packaged sensors are attached to the PCB via SMT and then the lens holder and lens are attached to the PCT. The advantage of using chip scale package is that it eliminates the need for extremely high level (class10) clean rooms.

In one embodiment, the camera modules are reflowable camera modules which are designed to withstand the reflow-heat-profile. In one embodiment, each of the reflowable camera modules is a complete camera shipped in tape-and-reel and thus can be attached to the PCB as other passive components. In one embodiment, for assembling the camera array, the entire camera module is placed on the PCB (substrate) using pick-and-place machines. The camera modules along with other surface mounted components are held in place with solder flux and the whole board is put in a SMT oven to cause the reflow process to occur.

In another embodiment, rather than using individual lens holders, a single lens holder and a single array lenses unit is used. In this case, the individual lens focal lens is adjusted, if necessary, using the thickness and properties of the infra-red filter. The thicker the IR filter, the more it pushes out the focal length. Therefore, in one embodiment, a thicker IR filter is added to lenses whose focal length comes in short to match them with the longest focal length lens. After the IR filter is added, the focal length can match that of the longest lenslet focal length. In one embodiment, to make the adjustment is using the thickness and properties of the filter, assume that ideally all the lenses should focus 1 mm distance from the exit pupil of the lens, and assume that the lens array has 12 lens-lets, arranged in a 4×3 arrangement. Assume that each lens in the array can have an error in focus distance which ranges from +100 microns to −100 microns making the focal distance to range from 900 microns to 1.1 mm. Since there is no freedom to individually move each lens in the lens array, a separate piece of glass that is matched with the focus-error of that lenslet is used so that the corrected focus length is 1.2 mm for all the lenlets in the array. Each sensor/lenlet pair needs an IR cut-filter and hence the focus-error can be adopted and the IR cut is provided using this optical element.

Figure 5:
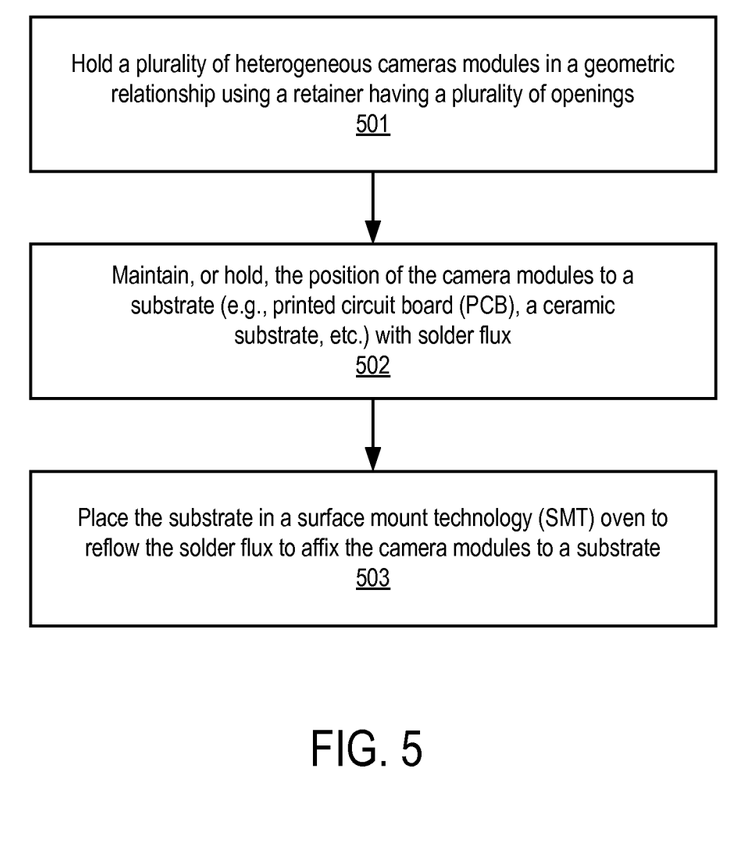
FIG. 5 is a flow diagram of one embodiment of a process for assembling a multi-camera system using individual camera modules.

FIG. 5 is a flow diagram of one embodiment of a process for assembling a multi-camera system using individual camera modules. Referring to FIG. 5, the process begins by holding a plurality of heterogeneous camera modules in a geometric relationship using a retainer having a plurality of openings (processing block 501). In one embodiment, the camera modules are reflowable camera modules that are able to go through an SMT reflow process without damaging the camera modules. In one embodiment, the camera module comprises a sensor, lens, a lens holder, and an infra-red (IR) filter. In one embodiment, the camera sensors of the plurality of camera modules are part of chip-scale packages.

Next, process includes maintaining, or holding, the position of the camera modules to a substrate (e.g., printed circuit board (PCB), a ceramic substrate, etc.) with solder flux (processing block 502). In one embodiment, the substrate comprises a stiffened printed circuit board (PCB) with a low coefficient of expansion material. In one embodiment, the substrate comprises a ceramic substrate.

While maintaining the position of the camera modules, the process places the substrate in a surface mount technology (SMT) oven to reflow the solder flux to affix the camera modules to a substrate (processing block 503).

Figure 6:
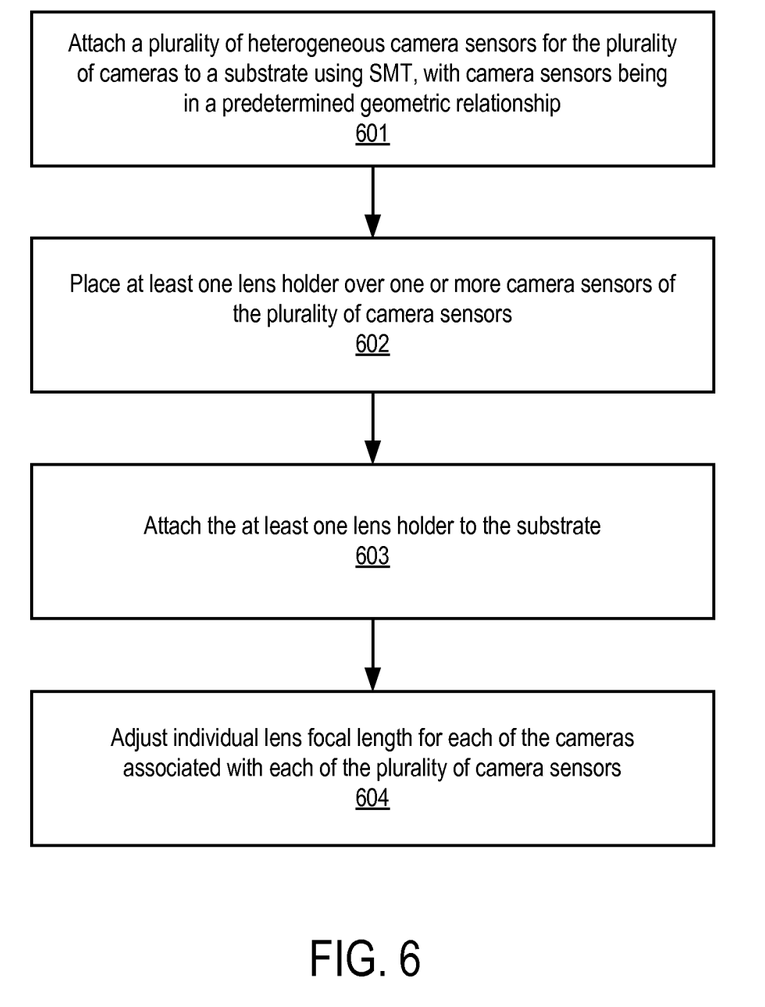
FIG. 6 is a flow diagram of another embodiment of a process for assembling a multi-camera system using individual camera modules.

FIG. 6 is a flow diagram of another embodiment of a process for assembling a multi-camera system using individual camera modules. Referring to FIG. 6, the process begins by attaching a plurality of heterogeneous camera sensors for a plurality of cameras to a substrate using SMT, with camera sensors being in a predetermined geometric relationship (processing block 601). In one embodiment, the camera sensors are part of chip-scale packages. In one embodiment, the substrate comprises a stiffened printed circuit board (PCB) with a low coefficient of expansion material. In one embodiment, the substrate comprises a ceramic substrate.

Next, the process places at least one lens holder over one or more camera sensors of the plurality of camera sensors (processing block 602) and attaches the at least one lens holder to the substrate (processing block 603). In one embodiment, placing at least one lens holder over one or more camera sensors of the plurality of camera sensors comprises placing a lens holder over each camera sensor of the plurality of camera sensors. In one embodiment, placing at least one lens holder over one or more camera sensors of the plurality of camera sensors comprises placing a single lens holder over the plurality of camera sensors, the single lens holder containing a lens and an infra-red (IR) filter for each camera sensor of the plurality of camera sensors.

Once the lens holder(s) is attached, the process adjusts individual lens focal length for each of the cameras associated with each of the plurality of camera sensors (processing block 604). In one embodiment, adjusting lenses comprises adjusting individual lens focal length is perform by using the thickness and properties of the infra-red filter.

The techniques described herein enables building camera arrays using well known methods which will lead to lower-cost and better time to market. Furthermore, the techniques for building multi-camera systems have numerous advantages over the array-camera approach described above. First, these techniques allow more freedom in how the system is set and configured using the same basic building blocks. Second, the techniques allow camera module integrators to use the traditional factory station to build camera arrays or multi-camera system. Third, the yield of this approach can be as high as traditional cameras assembly since it uses the traditional assembly stations and assembly know-how. Fourth, since these module are independent of each other, a defective module can be reworked and replaced, as opposed to defects in a single sub-array in the array-silicon which implies that the whole module is lost, thereby resulting in low yields and high unit cost. Fifth, the techniques described herein natively comes with power-gating and clock gating—a feature which is quite expensive to build into a single piece of silicon. Sixth, the techniques described herein allow mixing and matching different sensors with completely different specifications and even different suppliers. For example, one of the modules could be a 8M-pixel camera with a 1.1 micron pixel, while the other modules could be 2Mega-pixel with a 1.4 micron pixel. This degree of freedom is very valuable to original equipment manufacturers (OEMs).

Figure 7:
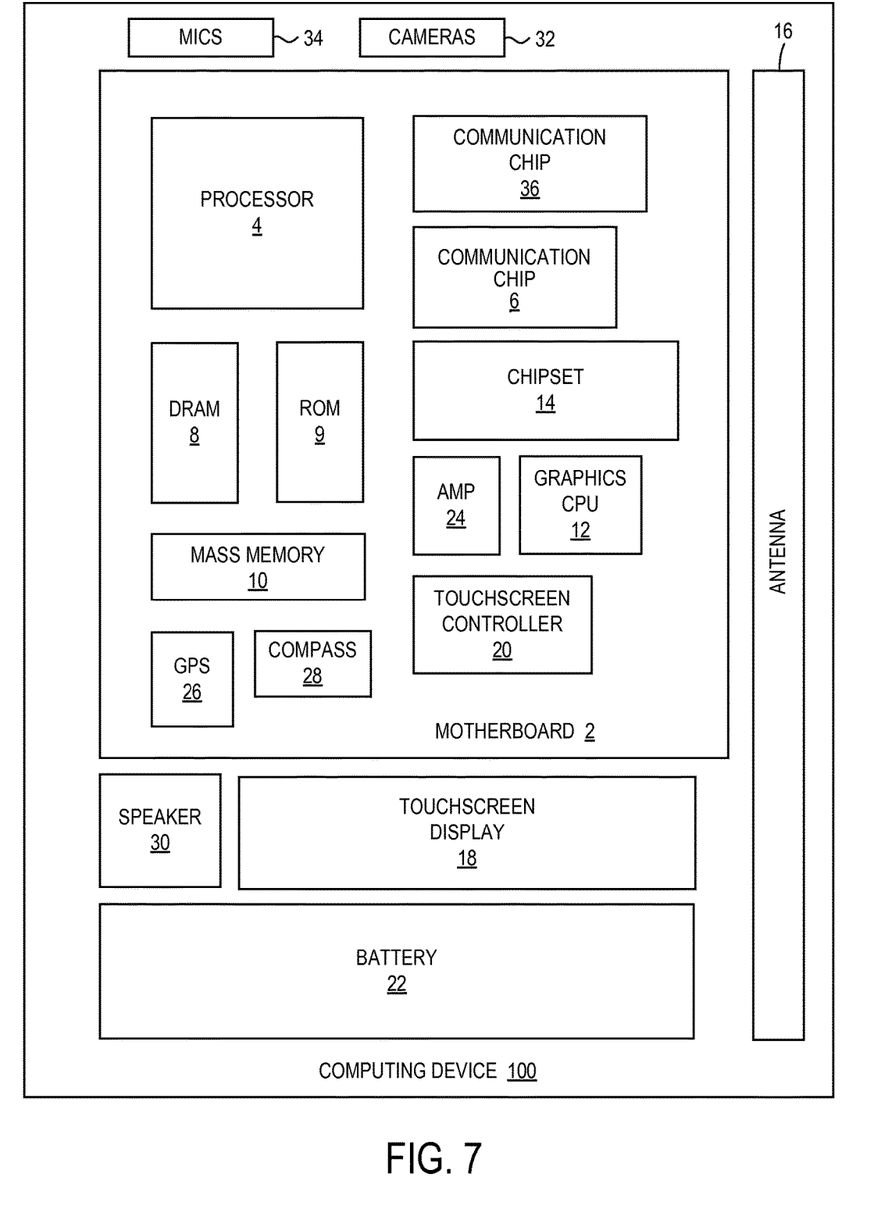
FIG. 7 illustrates a portable image capture device.

FIG. 7 illustrates a portable image capture device 100 in accordance with one implementation. The imaging device 100 houses a system board 2. The board 2 may include a number of components, including but not limited to a camera array as described above, a processor 4, and at least one communication package 6. The communication package may be coupled to one or more antennas 16. The processor 4 is physically and electrically coupled to the board 2.

Depending on its applications, image capture device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera array 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The camera array may be coupled to an image chip 36, such as an imaging signal processor and to the processor 4, either directly or through the image chip. The image chip may take a variety of different forms, such as a graphics co-processor, or a separate dedicated imaging management module. Such a module or device may comprise logic, algorithms, and/or instructions operative to capture, process, edit, compress, store, print, and/or display one or more images. These processes may include de-noising, image recognition, image enhancement and other processes described herein. In some embodiments, the imaging management module may comprise programming routines, functions, and/or processes implemented as software within an imaging application or operating system. In various other embodiments, the imaging management module may be implemented as a standalone chip or integrated circuit, or as circuitry comprised within the processor, within a CPU, within a graphics chip or other integrated circuit or chip, or within a camera module.

The communication package 6 enables wireless and/or wired communications for the transfer of data to and from the video device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The video device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

Cameras 32 may include all of the components of the camera or share resources, such as memory 8, 9, 10, processing 4 and user interface 12, 20, with other video device components and functions. The processor 4 is coupled to the camera and to memory to receive frames and produce enhanced images. In one embodiment, cameras 32 include an image capture sensor(s) and color filter array describe above. In one embodiment, cameras 32 also include an image processing system, as described above.

In various implementations, the image capture device 100 may be a video camera, a digital single lens reflex or mirror-less camera, a cellular telephone, a media player, laptop, a netbook, a notebook, an ultrabook, a smartphone, a wearable device, a tablet, a personal digital assistant (PDA), an ultra mobile PC, or a digital video recorder. The image capture device may be fixed, portable, or wearable. In further implementations, the image capture device 100 may be any other electronic device that records a sequence of image frames and processes data.

In a first example embodiment, a multi-camera apparatus comprises a substrate, and heterogeneous camera modules attached to the substrate and in a geometric relationship with each other, the heterogeneous camera modules having a substantially similar photometric response.

In another example embodiment, the subject matter of the first example embodiment can optionally include that the camera modules are reflowable camera modules.

In another example embodiment, the subject matter of the first example embodiment can optionally include that the camera modules are soldered to the substrate using surface mount technology (SMT).

In another example embodiment, the subject matter of the first example embodiment can optionally include that the substrate comprises a stiffened printed circuit board (PCB) with a low coefficient of expansion material.

In another example embodiment, the subject matter of the first example embodiment can optionally include that the substrate comprises a ceramic substrate.

In another example embodiment, the subject matter of the first example embodiment can optionally include that the camera modules are synchronized with each other using a frame-sych pin of each module.

In another example embodiment, the subject matter of the first example embodiment can optionally include that the camera modules are synchronized with each other using a general purpose input/output (GPIO) pin.

In another example embodiment, the subject matter of the first example embodiment can optionally include that the camera modules are synchronized with each other using software commands sent to the camera modules over a control bus (e.g., an I2C bus).

In a second example embodiment, q method for assembling a multi-camera system using individual camera modules comprises holding a plurality of heterogeneous camera modules in a geometric relationship using a retainer having a plurality of openings, the camera modules being reflowable camera modules, maintaining position of the camera modules with solder flux, and placing the board in a surface mount technology (SMT) oven to reflow the solder flux to affix the camera modules to a substrate.

In another example embodiment, the subject matter of the second example embodiment can optionally include that the substrate comprises a stiffened printed circuit board (PCB) with a low coefficient of expansion material.

In another example embodiment, the subject matter of the second example embodiment can optionally include that the substrate comprises a ceramic substrate.

In another example embodiment, the subject matter of the second example embodiment can optionally include that the camera module comprises a sensor, lens, a lens holder, and an infra-red (IR) filter.

In another example embodiment, the subject matter of the second example embodiment can optionally include that the camera sensors of the plurality of camera modules are part of chip-scale packages.

In a third example embodiment, a method for assembling a multi-camera system using individual camera modules comprises attaching a plurality of heterogeneous camera sensors for a plurality of cameras to a substrate using SMT, where the plurality of heterogeneous camera sensors are in a predetermined geometric relationship, placing at least one lens holder over one or more camera sensors of the plurality of camera sensors, attaching the at least one lens holder to the substrate, and adjusting individual lens focal length for each of the cameras associated with each of the plurality of camera sensors.

In another example embodiment, the subject matter of the third example embodiment can optionally include that placing at least one lens holder over one or more camera sensors of the plurality of camera sensors comprises placing a lens holder over each camera sensor of the plurality of camera sensors.

In another example embodiment, the subject matter of the third example embodiment can optionally include that placing at least one lens holder over one or more camera sensors of the plurality of camera sensors comprises placing a single lens holder over the plurality of camera sensors, the single lens holder containing a lens and an infra-red (IR) filter for each camera sensor of the plurality of camera sensors.

In another example embodiment, the subject matter of the third example embodiment can optionally include that adjusting individual lens focal length comprise adjusting individual lens focal length is perform by using the thickness and properties of the infra-red filter.

In another example embodiment, the subject matter of the third example embodiment can optionally include that the camera sensors are part of chip-scale packages.

In another example embodiment, the subject matter of the third example embodiment can optionally include that the substrate comprises a stiffened printed circuit board (PCB) with a low coefficient of expansion material.

In another example embodiment, the subject matter of the third example embodiment can optionally include that the substrate comprises a ceramic substrate.

Some portions of the detailed descriptions set forth above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A multi-camera apparatus comprising:
a substrate; and
a plurality of discrete and separate heterogeneous camera modules, each discrete and separate heterogeneous camera module comprising a sensor, a filter, a lens, and a lens holder, and each discrete and separate heterogeneous camera module individually and separately attached to the substrate and in a geometric relationship with each other, wherein the plurality of discrete and separate heterogeneous camera modules have a substantially similar photometric response and at least two separate and heterogeneous camera modules have different types of separate image sensor arrays.

2. The multi-camera apparatus of claim 1, wherein the discrete and separate heterogeneous camera modules are reflowable camera modules.

3. The multi-camera apparatus of claim 1, wherein the discrete and separate heterogeneous camera modules are soldered to the substrate using surface mount technology (SMT).

4. The multi-camera apparatus of claim 1, wherein the substrate comprises a stiffened printed circuit board (PCB) with a low coefficient of expansion material.

5. The multi-camera apparatus of claim 1, wherein the substrate comprises a ceramic substrate.

6. The multi-camera apparatus of claim 1, wherein the discrete and separate heterogeneous camera modules are synchronized with each other using a frame-synch pin of each module.

7. The multi-camera apparatus of claim 1, wherein the discrete and separate heterogeneous camera modules are synchronized with each other using a general purpose input/output (GPIO) pin.

8. The multi-camera apparatus of claim 1, wherein the discrete and separate heterogeneous camera modules are synchronized with each other using software commands sent to the camera modules over a control bus.

9. A method for assembling a multi-camera system using individual camera modules comprising:

holding a plurality of discrete and separate heterogeneous camera modules in a geometric relationship using a retainer having a plurality of openings, the discrete and separate heterogeneous camera modules comprising a sensor, a filter, a lens, and a lens holder, and each discrete and separate heterogeneous camera module being reflowable camera modules including separate image sensor arrays, wherein at least two discrete and separate heterogeneous camera modules have different types of separate image sensor arrays;

maintaining position of the discrete and separate heterogeneous camera modules with solder flux; and placing a substrate in a surface mount technology (SMT) oven to reflow the solder flux to affix the discrete and separate heterogeneous camera modules to the substrate.

10. The method of claim 9, wherein the substrate comprises a stiffened printed circuit board (PCB) with a low coefficient of expansion material.

11. The method of claim 9, wherein the substrate comprises a ceramic substrate.

12. The method of claim 9, wherein the discrete and separate heterogenous camera module comprises a sensor, lens, a lens holder, and an infra-red (IR) filter.

13. The method of claim 12, wherein the sensor of the plurality of discrete and separate heterogenous camera modules are part of chip-scale packages.

14. A method for assembling a multi-camera system using individual camera modules comprising:

attaching a plurality of discrete and separate heterogeneous camera sensors a substrate using surface mount technology (SMT), wherein each of the discrete and separate heterogeneous camera sensors corresponds to a discrete and separate heterogeneous camera module that comprises a filter and a lens, which is positioned over respective discrete and separate heterogeneous camera sensor, the plurality of discrete and separate heterogeneous camera sensors being in a predetermined geometric relationship, and wherein at least two discrete and separate heterogenous camera sensors have different camera sensor types placing at least one lens holder over one or more discrete and separate heterogenous camera sensors;

attaching the at least one lens holder to the substrate;

adjusting individual lens focal length for each of the individual camera modules including one of the discrete and separate heterogenous camera sensors.

15. The method of claim 14, wherein placing at least one lens holder over one or more discrete and separate heterogenous camera sensors comprises placing a lens holder over each camera sensor of the plurality of camera sensors.

16. The method of claim 14, wherein placing at least one lens holder over one or more discrete and separate heterogenous camera sensors comprises placing a single lens holder over the plurality of discrete and separate heterogenous camera sensors, the single lens holder containing a lens and an infra-red (IR) filter for each discrete and separate heterogenous camera sensor.

17. The method of claim 14, wherein adjusting individual lens focal length comprise adjusting individual lens focal length is perform by using the thickness and properties of the infra-red filter.

18. The method of claim 14, wherein the plurality of discrete and separate heterogenous camera sensors are part of chip-scale packages.

19. The method of claim 14, wherein the substrate comprises a stiffened printed circuit board (PCB) with a low coefficient of expansion material.

20. The method of claim 14, wherein the substrate comprises a ceramic substrate.

* * * * *